US009121380B2

(12) United States Patent
Fulton

(10) Patent No.: US 9,121,380 B2
(45) Date of Patent: Sep. 1, 2015

(54) STARTER MACHINE SYSTEM AND METHOD

(75) Inventor: David A. Fulton, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 632 days.

(21) Appl. No.: 13/442,655

(22) Filed: Apr. 9, 2012

(65) Prior Publication Data

US 2012/0256523 A1 Oct. 11, 2012

Related U.S. Application Data

(60) Provisional application No. 61/473,038, filed on Apr. 7, 2011.

(51) Int. Cl.

| | |
|---|---|
| ***H02K 16/00*** | (2006.01) |
| ***F02N 11/02*** | (2006.01) |
| ***F02N 15/00*** | (2006.01) |
| ***F02N 15/06*** | (2006.01) |
| *F02N 11/08* | (2006.01) |
| *F02N 15/02* | (2006.01) |
| *F02N 15/04* | (2006.01) |

(52) U.S. Cl.

CPC ................ *F02N 11/02* (2013.01); *F02N 15/00* (2013.01); *F02N 15/066* (2013.01); *F02N 11/0844* (2013.01); *F02N 11/0851* (2013.01); *F02N 15/023* (2013.01); *F02N 15/046* (2013.01); *F02N 2011/0896* (2013.01); *F02N 2200/022* (2013.01); *F02N 2200/041* (2013.01); *F02N 2200/047* (2013.01); *F02N 2200/048* (2013.01); *Y10T 29/49009* (2015.01)

(58) Field of Classification Search

USPC ........................... 310/75 R, 112–114; 29/596

IPC ............................................ H02K 16/00,16/02

See application file for complete search history.

(56) References Cited

U.S. PATENT DOCUMENTS

| | | | | |
|---|---|---|---|---|
| 5,622,148 A | | 4/1997 | Xue et al. | |
| 5,838,135 A | * | 11/1998 | Satake et al. | 318/771 |
| 5,959,385 A | * | 9/1999 | Kato et al. | 310/112 |
| 5,990,590 A | * | 11/1999 | Roesel et al. | 310/113 |

(Continued)

FOREIGN PATENT DOCUMENTS

| | | |
|---|---|---|
| JP | 2001099038 A | 4/2001 |
| JP | 2002070699 | 3/2002 |

OTHER PUBLICATIONS

WIPO Search Report and Written Opinion dated Dec. 26, 2012 for corresponding Application No. PCT/US2012/032779; 9 sheets.

(Continued)

*Primary Examiner* — Dang Le

(74) *Attorney, Agent, or Firm* — Greenberg Traurig, LLP

(57) ABSTRACT

Embodiments of the invention provide a starter machine including a housing. A motor can be positioned within the housing and coupled to a gear train, which can be coupled to a shaft. A switched reluctance solenoid assembly can be positioned within the housing and capable of being coupled to inverters that communicate with an electronic control unit. The switched reluctance solenoid assembly includes at least two switched reluctance stator assemblies and a rotor that is coupled to the shaft. The rotor can also include an integral pinion and is movably positioned within the switched reluctance stator assemblies. The rotor is capable of linear and rotational movement.

20 Claims, 8 Drawing Sheets

(56) References Cited

U.S. PATENT DOCUMENTS 6,011,377 A 1/2000 Heglund et al.
6,104,157 A 8/2000 Kramer et al.
6,323,562 B1 11/2001 Renner et al.
6,608,394 B2 8/2003 Osada et al.
6,634,332 B2 10/2003 Saito et al.
6,651,603 B2 11/2003 Osada et al.
6,653,807 B2 11/2003 Saito et al.
6,702,718 B2 3/2004 Tani
6,754,579 B2 6/2004 Kamiya et al.
6,817,329 B2 11/2004 Buglione et al.
6,822,544 B2 11/2004 Shiga et al.
7,009,475 B2 3/2006 Niimi et al.
7,027,911 B2 4/2006 Nishikawa et al.
7,066,128 B2 6/2006 Satake et al.
7,177,755 B2 2/2007 Nishikawa et al.
7,218,010 B2 5/2007 Albertson et al.
7,219,007 B2 5/2007 Schuster et al.
7,269,499 B2 9/2007 Murakami
7,275,509 B2 10/2007 Kassner
7,281,510 B2 10/2007 Kondo
7,287,500 B2 10/2007 Izumi et al.
7,458,353 B2 12/2008 Takahashi
7,535,328 B2 5/2009 Kurasawa
7,628,138 B2 12/2009 Ando
7,701,104 B2 4/2010 Akemakou
7,733,201 B2 6/2010 Yoneshima
7,760,056 B2 7/2010 Utsunomiya et al.
7,797,099 B2 9/2010 Terada
7,848,875 B2 12/2010 Nakai
7,861,683 B2 1/2011 Saitoh
7,934,436 B2 5/2011 Laubender
7,949,461 B2 5/2011 Takahashi
7,982,565 B2 7/2011 Bradfield
8,036,815 B2 10/2011 Okumoto et al.
8,069,832 B2 12/2011 Okumoto et al.
2003/0150417 A1 8/2003 Miwa
2003/0209373 A1 11/2003 Egami et al.
2004/0112319 A1 6/2004 Hnilica
2004/0168664 A1 9/2004 Senda et al.
2005/0051126 A1 3/2005 Oomi et al.
2006/0058897 A1 3/2006 Senda et al.
2006/0117876 A1 6/2006 Lepres et al.
2006/0201266 A1 9/2006 Kajino et al.
2007/0199533 A1 8/2007 Takahashi
2007/0215089 A1 9/2007 Grand et al.
2009/0020091 A1 1/2009 Botzenhard et al.
2009/0183595 A1 7/2009 Niimi
2009/0224557 A1 9/2009 Reynolds et al.
2009/0295399 A1 12/2009 Ueda et al.
2010/0000487 A1 1/2010 Hoshino et al.
2010/0033066 A1 2/2010 Murata et al.
2010/0036591 A1 2/2010 Nakai
2010/0059007 A1 3/2010 Senda et al.
2010/0083926 A1 4/2010 Okumoto et al.
2010/0090526 A1 4/2010 Itou
2010/0180849 A1 7/2010 Senda et al.
2010/0184562 A1 7/2010 Senda et al.
2010/0217484 A1 8/2010 Mizuno
2010/0217493 A1 8/2010 Tomura et al.
2010/0222973 A1 9/2010 Senda et al.
2010/0229815 A1 9/2010 Senda et al.
2010/0242905 A1 9/2010 Machida et al.
2010/0251851 A1 10/2010 Usami et al.
2010/0251852 A1 10/2010 Murata et al.
2010/0251853 A1 10/2010 Usami et al.
2010/0256896 A1 10/2010 Kitano et al.
2010/0257975 A1 10/2010 Niimi et al.
2010/0264670 A1 10/2010 Usami et al.
2010/0264764 A1 10/2010 Usami et al.
2010/0264765 A1 10/2010 Haruno et al.
2010/0269630 A1 10/2010 Niimi et al.
2010/0269631 A1 10/2010 Niimi et al.
2010/0269776 A1 10/2010 Mizuno
2010/0282199 A1 11/2010 Heyers et al.
2010/0282200 A1 11/2010 Notani
2011/0001589 A1 1/2011 Usami et al.
2011/0005486 A1 1/2011 Nakamura
2011/0056450 A1 3/2011 Notani
2011/0084786 A1 4/2011 Niimi et al.
2011/0095852 A1 4/2011 Niimi et al.
2011/0112740 A1 5/2011 Hashimoto
2011/0115238 A1 5/2011 Biessenberger et al.
2011/0118962 A1 5/2011 Couetous et al.
2011/0132308 A1 6/2011 Liu et al.
2011/0137544 A1 6/2011 Kawazu et al.
2011/0139108 A1 6/2011 Hashim
2011/0146609 A1 6/2011 Enoki
2011/0174255 A1 7/2011 Neuburger et al.
2011/0184626 A1 7/2011 Mauritz et al.
2011/0248803 A1 10/2011 Niimi et al.
2012/0035837 A1 2/2012 Okumoto et al.

OTHER PUBLICATIONS

WIPO Search Report and Written Opinion dated Oct. 29, 2012 for corresponding Application No. PCT/US2012/032801; 7 sheets.

* cited by examiner

STARTER MACHINE SYSTEM AND METHOD

RELATED APPLICATIONS

This application claims priority under 35 U.S.C. §119 to U.S. Provisional Patent Application No. 61/473,038 filed on Apr. 7, 2011, the entire contents of which is incorporated herein by reference.

BACKGROUND

Some electric machines can play important roles in vehicle operation. For example, some vehicles can include a starter machine, which can, upon a user closing an ignition switch, lead to cranking of engine components of the vehicle. Some starter machines can include a field assembly comprising a magnetic field to rotate some starter machine components during the ignition process.

Some starter machines include a solenoid assembly and a pinion for use in cranking engine components. Upon receipt of an activation signal (e.g., a user closing the ignition switch), the solenoid assembly can direct the pinion to engage some of the engine components, such as a ring gear. However, repeated activation of at least some conventional starter machines can lead to wear on at least some of their components.

SUMMARY

Embodiments of the invention include a starter machine including a housing. In some embodiments, a motor can be at least partially disposed within the housing and the motor can be operatively coupled to a gear train. In some embodiments, the gear train can also be coupled to a shaft. In some embodiments, a switched reluctance solenoid assembly can be at least partially disposed within the housing and can be capable of being electrically coupled to at least two inverters that are in communication with an electronic control unit. The switched reluctance solenoid assembly can include at least two switched reluctance stator assemblies that can each comprise a plurality of salient poles. In some embodiments, the switched reluctance solenoid assembly can include a rotor that can be operatively coupled to the shaft and can comprise an integral pinion. In some embodiments, the rotor can be movably positioned within the switched reluctance stator assemblies and can be capable of linear and rotational movement.

DETAILED DESCRIPTION

Figure 1:
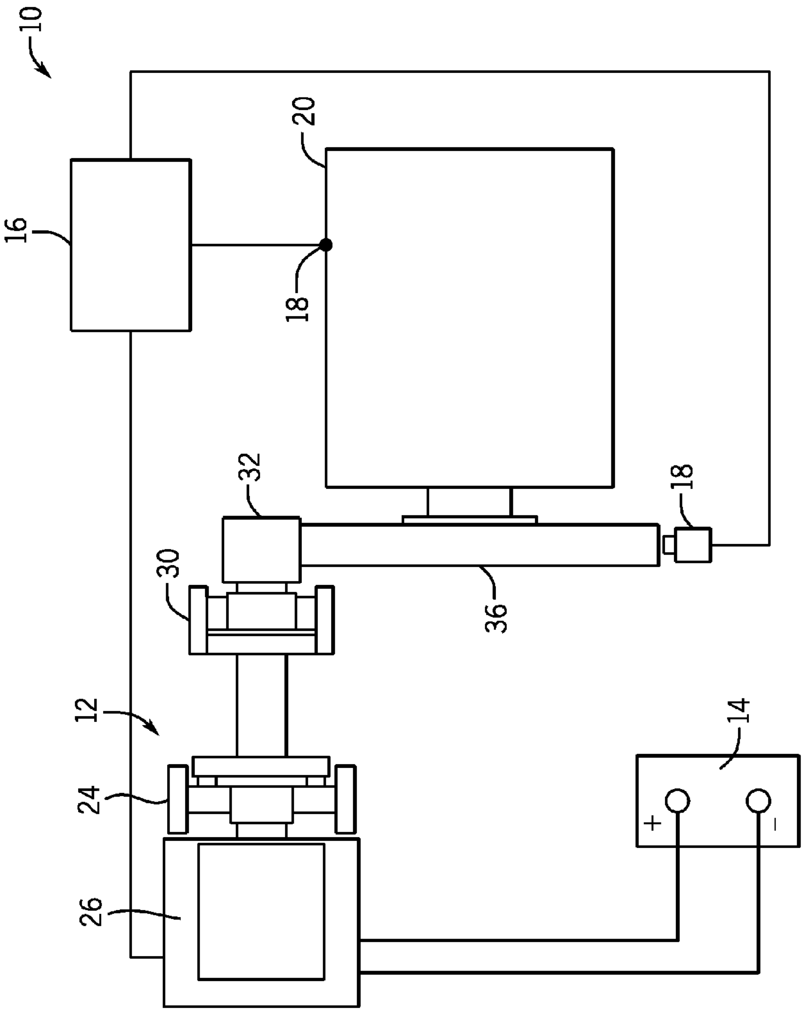
FIG. 1 is a diagram of a starter machine control system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

FIG. 1 illustrates a starter machine control system 10 according to one embodiment of the invention. The system 10 can include an electric machine 12, a power source 14, such as a battery, an electronic control unit 16, one or more sensors 18, and an engine 20, such as an internal combustion engine. In some embodiments, a vehicle, such as an automobile, can comprise the system 10, although other vehicles can include the system 10. In some embodiments, non-mobile apparatuses, such as stationary engines, can comprise the system 10.

The electric machine 12 can be, without limitation, an electric motor, such as a hybrid electric motor, an electric generator, a starter machine, or a vehicle alternator. In one embodiment, the electric machine can be a High Voltage Hairpin (HVH) electric motor or an interior permanent magnet electric motor for hybrid vehicle applications.

Figure 2:
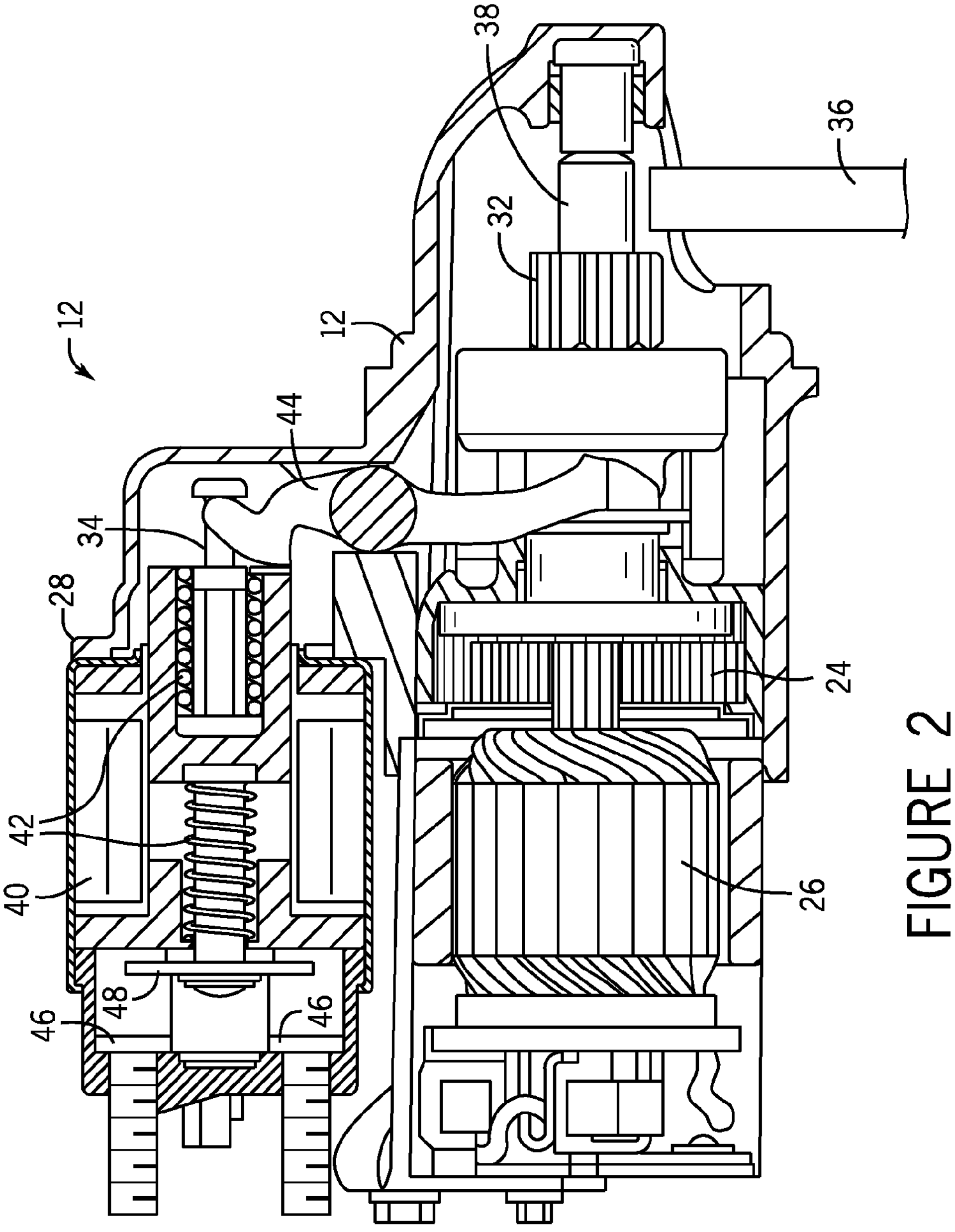
FIG. 2 is a cross-sectional view of a conventional starter machine.

As shown in FIG. 2, in some embodiments, the electric machine 12 can comprise a starter machine 12. In some embodiments, the starter machine 12 can comprise a housing 22, a gear train 24, a brushed or brushless motor 26, a solenoid assembly 28, a clutch 30 (e.g., an overrunning clutch), and a pinion 32. In some embodiments, the starter machine 12 can operate in a generally conventional manner. For example, in response to a signal (e.g., a user closing a switch, such as an ignition switch), the solenoid assembly 28 can cause a plunger 34 to move the pinion 32 into an engagement position with a ring gear 36 of a crankshaft of the engine 20. Further, the signal can lead to the motor 26 generating an output (e.g., torque, speed, etc.), which can be translated through the gear train 24, which can include a conventional planetary gear assembly configuration, to the pinion 32 engaged with the ring gear 36. As a result, in some embodiments, the pinion 32 can move the ring gear 36, which can crank the engine 20, leading to engine 20 ignition. Further, in some embodiments, the overrunning clutch 30 can aid in reducing a risk of damage to the starter machine 12 and the motor 26 by disengaging the pinion 32 from a shaft 38 (e.g., an output shaft 38) connecting the pinion 32 and the motor 26 (e.g., allowing the pinion 32 to free spin if it is still engaged with the ring gear 36).

In some embodiments, the starter machine 12 can comprise multiple configurations. For example, in some embodiments, the solenoid assembly 28 can comprise one or more configurations. In some embodiments, the solenoid assembly 28 can comprise the plunger 34, a coil winding 40, and a plurality of biasing members 42 (e.g., springs or other structures capable of biasing portions of the solenoid assembly 28). In some embodiments, a first end of a shift lever 44 can be coupled to the plunger 34 and a second end of the shift lever 44 can be coupled to the pinion 32 and/or the shaft 38 that can operatively couple together the motor 26 and the pinion 32. As a result, in some embodiments, at least a portion of the movement created by the solenoid assembly 28 can be transferred to the pinion 32 via the shift lever 44 to engage the pinion 32 with the ring gear 36, as previously mentioned.

Moreover, in some embodiments, when the starter machine 12 is activated (e.g., by the user closing the ignition switch), the system 10 can energize the coil winding 40, which can cause movement of the plunger 34 (e.g., in a generally axial direction). For example, current flowing through the coil winding 40 can draw-in or otherwise move the plunger 34, and this movement can be translated to engagement of the pinion 32, via the shift lever 44 (i.e., the magnetic field created by current flowing through coil winding 40 can cause the plunger 34 to move). Moreover, the plunger 34 moving inward as a result of the energized coil winding 40 can at least partially compress one of the biasing members 42.

Additionally, in some embodiments, the plunger 34 can be drawn-in or otherwise moved to a position (e.g., an axially inward position) so that at least a portion of the plunger 34 (e.g., a lateral end of the plunger 34) can at least partially engage or otherwise contact one or more contacts 46 to close a circuit that provides current to the motor 26 from the power source 14. As a result, the motor 26 can be activated by the current flowing through the circuit closed by the plunger 34. For example, in some embodiments, the plunger 34 can comprise a plunger contact 48 that can engage the contacts 46 to close the circuit to enable current to flow to the motor 26.

In some embodiments, after partial or total completion of the starting event (e.g., the engine has at least partially turned over and combustion has begun), the coil winding 40 can be at least partially de-energized. In some embodiments, the reduction or removal of force retaining the plunger 34 in place (e.g., the magnetic field created by current flowing through the coil winding 40) can enable at least one of the compressed biasing members 42 to expand. As a result, the biasing member 42 can expand and return the plunger 34 to its original position before the initial energization of the coil winding 40 (i.e., a "home" position). Accordingly, the pinion 32 can be withdrawn from the ring gear 36 and return to its original position within the housing 22.

In some embodiments, repeated use of the solenoid assembly 28 to engage the pinion 32 and the ring gear 36 can result in wear upon at least a portion of the moving elements of the starter machine 12. For example, in some embodiments, the starter machine control system 10 can be used in some applications that can include multiple starting episodes per vehicle usage (e.g., a start-stop starting episode, as discussed below), and, as a result, the repeated usage of the system 10 can result in mechanical wear and damage to at least some portions of the starter machine 12 (e.g., the shift lever 44).

Moreover, in some embodiments, in order to reduce the time needed to start and/or restart the engine 20, the starter machine control system 10 can be configured and arranged to pre-engage the pinion 32 and the ring gear 36. For example, in some embodiments, after the engine 20 substantially or completely ceases moving, the starter machine 12 can receive a signal to engage the pinion 32 and the ring gear 36 so that the next starting episode does not have to the wait for the solenoid assembly 28 to be energized to move the pinion 32 into engagement with the ring gear 36. However, in some embodiments, a vehicle passenger could be able to perceive an auditory disturbance as a result of the solenoid assembly 28 being energized when the engine 20 is not active (e.g., from activation of the solenoid assembly 28 and the pinion 32 engaging the ring gear 36).

Some embodiments of the invention can provide improvements of the previously mentioned mechanical wear and auditory disturbance shortcomings. In some embodiments, the starter machine 12 can comprise alternative configurations. For example, in some embodiments, the starter machine 12 can comprise at least one switched reluctance solenoid assembly 50. Moreover, in some embodiments, the switched reluctance solenoid assembly 50 can be used in addition to or in lieu of the solenoid assembly 28. For example, as shown in FIG. 3, in some embodiments, the switched reluctance solenoid assembly 50 can be used in lieu of the solenoid assembly 28 (i.e., the starter machine 12 can be manufactured so that it operates without a solenoid assembly 28).

Figure 3:
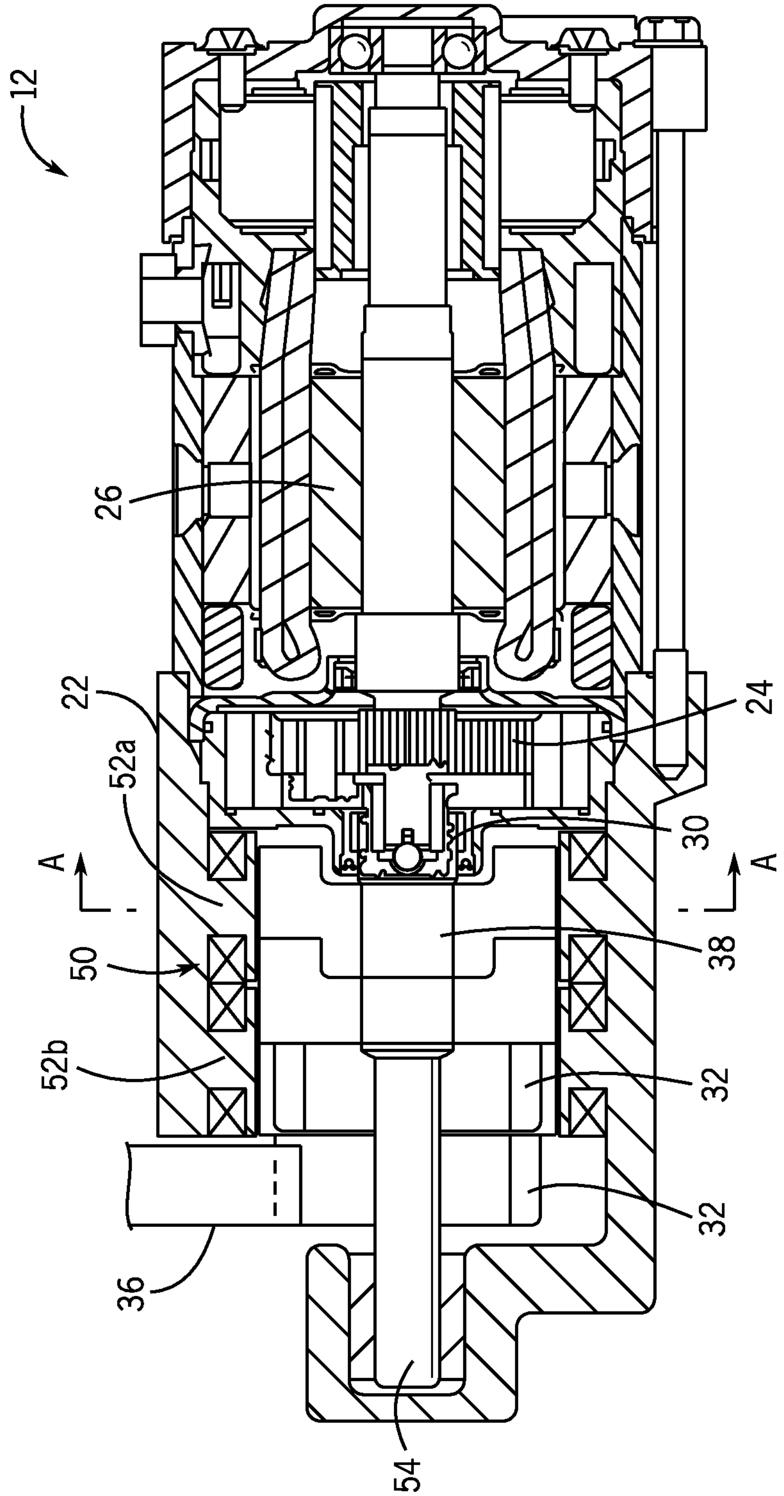
FIG. 3 is a cross-sectional view of a starter machine according to one embodiment of the invention.

As shown in FIG. 3, in some embodiments, the switched reluctance solenoid assembly 50 can be at least partially disposed within the housing 22. As shown in FIG. 2, in some embodiments, the conventional solenoid assembly 28 can be coupled to an outer portion of the housing 22 and the shift lever 44 can couple the plunger 34 to the pinion 32. As a result of the conventional configuration, the starter machine 12 can comprise a greater size (e.g., a greater width). As shown in FIG. 3, in some embodiments, the starter machine 12 can comprise the switched reluctance solenoid assembly 50 within the housing 22, which can at least partially reduce the size of the starter machine 12 (i.e., because the solenoid assembly 28 is not coupled to an outer portion of the housing 22). As a result, in some embodiments, space within an engine 20 compartment in a vehicle can be more efficiently used for other vehicle components and not for the solenoid assembly 28.

Figure 4A:
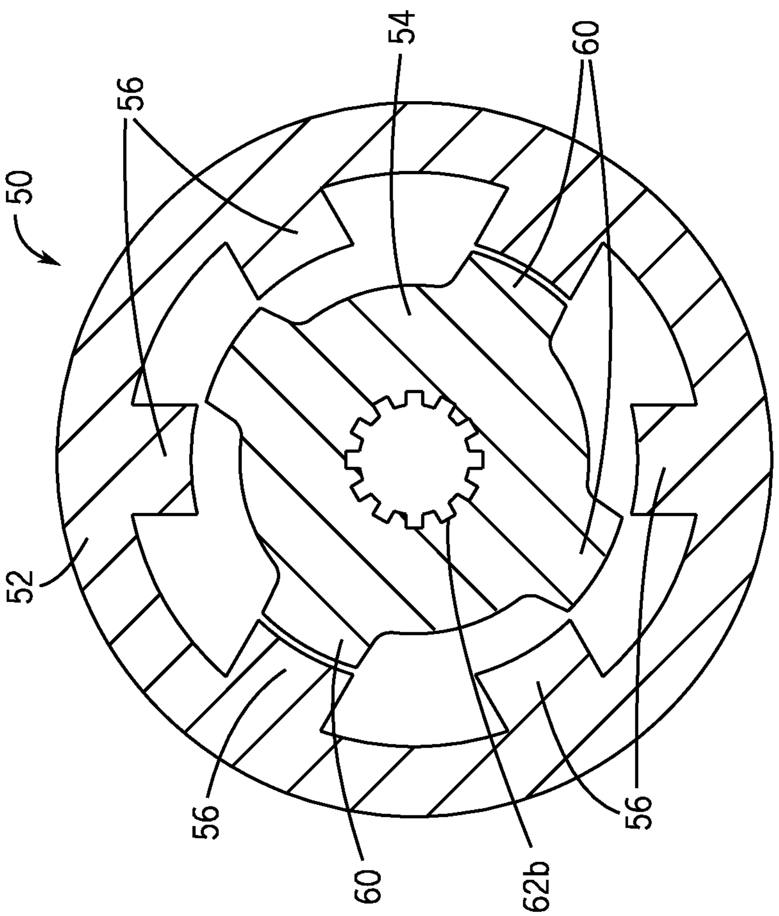
FIG. 4A is a cross-sectional view of a portion of the starter machine of FIG. 3 along line A.
Figure 4B:
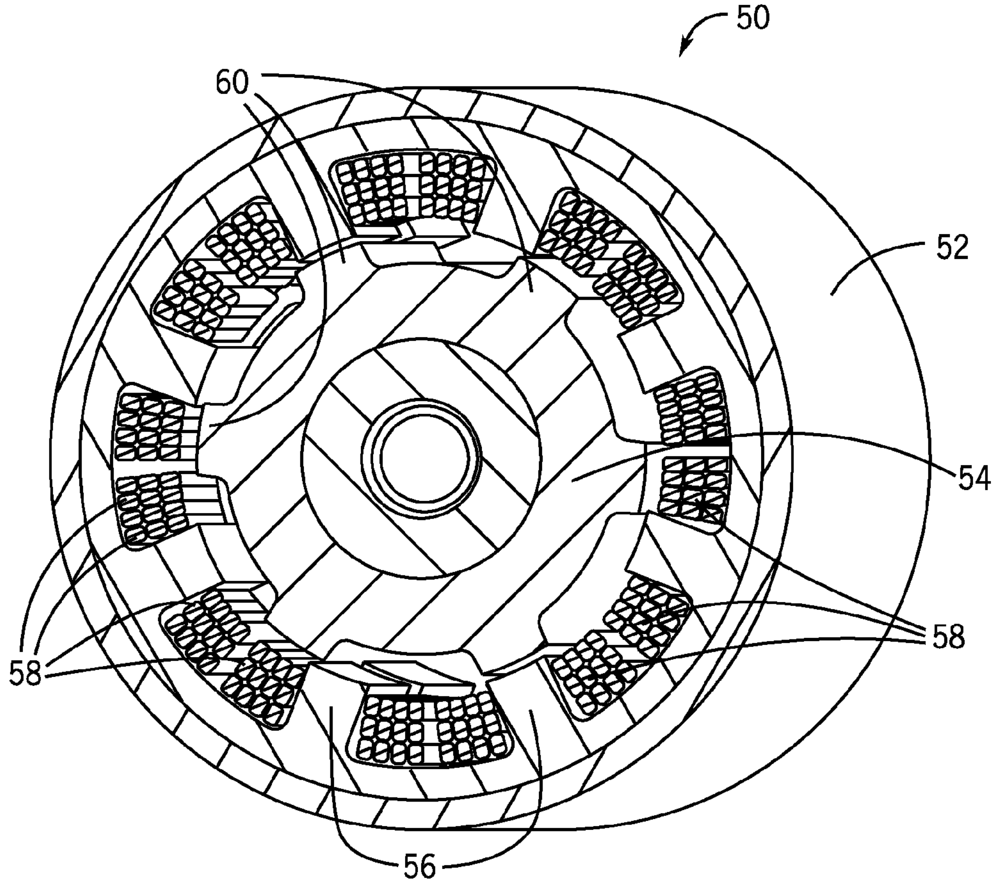
FIG. 4B is a cross-sectional view of a portion of a starter machine according to one embodiment of the invention.

In some embodiments, the switched reluctance solenoid assembly 50 can comprise a plurality of switched reluctance stator assemblies 52 and at least one rotor 54, as shown in FIGS. 3-4B. For example, in some embodiments, the switched reluctance solenoid assembly 50 can comprise a configuration and function substantially similar to a conventional switched reluctance motor. As shown in FIGS. 3, 5, and 6, 7A-7C, in some embodiments, the switched reluctance stator assemblies 52 can be generally axially arranged within the housing 22. For example, the switched reluctance solenoid assembly 50 can comprise two stator assemblies 52 that are axially arranged within the housing 22 at a point opposite from the motor 26 (e.g., adjacent to the pinion 32). In some embodiments, the rotor 54 can be at least partially disposed within one or both of the stator assemblies 52 (e.g., at least a portion of the rotor 54 can be at least partially circumscribed by one or both of the stator assemblies 52).

In some embodiments, one or both of the stator assemblies 52 can comprise a substantially conventional switched reluctance stator assembly configuration. For example, as shown in FIGS. 4A and 4B, in some embodiments, the switched reluctance stator assemblies 52 can comprise a plurality of salient poles 56. As shown in FIGS. 4A and 4B, the salient poles 56 can extend radially inward toward the rotor 54. Moreover, in some embodiments, the stator assemblies 52 can comprise one or more pole windings 58 disposed around some or all of the salient poles 56. For example, as shown in FIG. 4B, the stator assemblies 52 can comprise pole windings 58 disposed around each of the salient poles 56. In some embodiments, at least some portions of the stator assemblies 52 can comprise a metal-containing material. By way of example only, in some embodiments, the salient poles 56 and other portions of the stator assemblies 52 can comprise a steel-containing material. As a result, as described in further detail below, in some embodiments, when a current circulates through some or all of the pole windings 58, a magnetic flux can be generated that can be used in generating rotor 54 movement.

In some embodiments, the rotor 54 can be configured and arranged to move (e.g., rotate and/or linearly move) when current flows through the pole windings 58 and a magnetic flux is generated by the switched reluctance stator assemblies 52. As shown in FIGS. 4A and 4B, in some embodiments, the rotor 54 can comprise a plurality of rotor salient poles 60 that radially extend outward toward the stator salient poles 56. In some embodiments, the rotor 54 can comprise a metal-containing material. By way of example only, in some embodiments, the salient poles 60 and other portions of the rotor 54 can comprise a steel-containing material. As a result, when current circulates through the pole windings 58 and generates a magnetic flux around the stator salient poles 56, the rotor 54 can move (e.g., rotate and/or linearly move). Also, as shown in FIGS. 4A and 4B, in some embodiments, the stator assemblies 52 can comprise a different number of salient poles 56 relative to the rotor 54 (e.g., the stator assembly 52 can comprise a greater number of salient poles 56 relative to the rotor 54).

Figure 5:
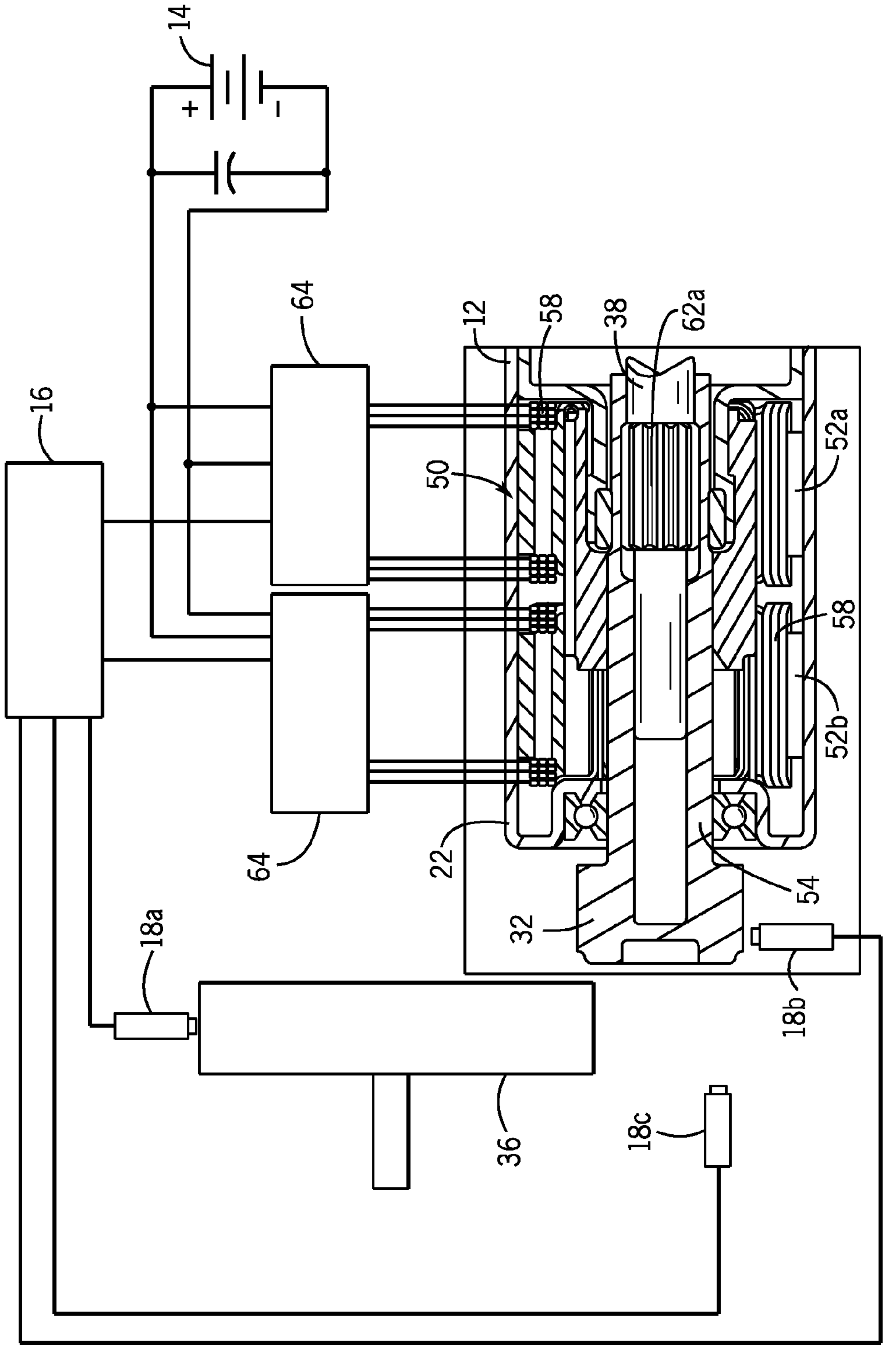
FIG. 5 is a diagram representing portions of a starter machine control system according to some embodiments of the invention.

In some embodiments, the rotor 54 can be coupled to at least one of the pinion 32 and the shaft 38. As shown in FIG. 5, the rotor 54 and the pinion 32 can be substantially or completely integral with each other. In other embodiments, the pinion 32 can be coupled to an axial end of the rotor 54 and configured so that linear movement (e.g., axial movement) of the rotor 54 can result in engagement of the pinion 32 and the ring gear 36. For example, as shown in FIG. 3, in some embodiments, linear movement of the rotor 54 can result in the rotor 54 and the pinion 32 moving from an axially inner position (i.e., a home position) toward the ring gear 36 (i.e., an engagement or abutment position) upon energization of the pole windings 58.

Moreover, in some embodiments, the rotor 54 can be coupled to the shaft 38. For example, in some embodiments, at least a portion of an outer surface the shaft 38 can comprise a plurality of shaft splines 62*a* that are configured and arranged to engage a plurality of rotor splines 62*b* that can be disposed on an inner surface of the rotor 54, as shown in FIGS. 4A and 5. As a result of the spline 62*a*-spline 62*b* interaction, at least a portion of the torque received from the motor 26 through the gear train 24 and/or the clutch 30 can be transmitted to the rotor 54. Moreover, because the rotor 54 and the pinion 32 can be integral, when the pinion 32 is engaged with the ring gear 36, at least a portion of the torque transmitted to the shaft 38 can be transferred to the pinion 32 via the rotor 54. In some embodiments, the rotor 54 and the shaft 38 can be coupled in other manners. For example, in some embodiments, the rotor 54 can be coupled to the shaft 38 via an interference fit, coupling structures such as, but not limited to screws, bolts, and/or other fasteners, welding, brazing, adhesives, etc. Moreover, in some embodiments, the rotor 54 and the shaft 38 can be substantially integral.

Figure 6:
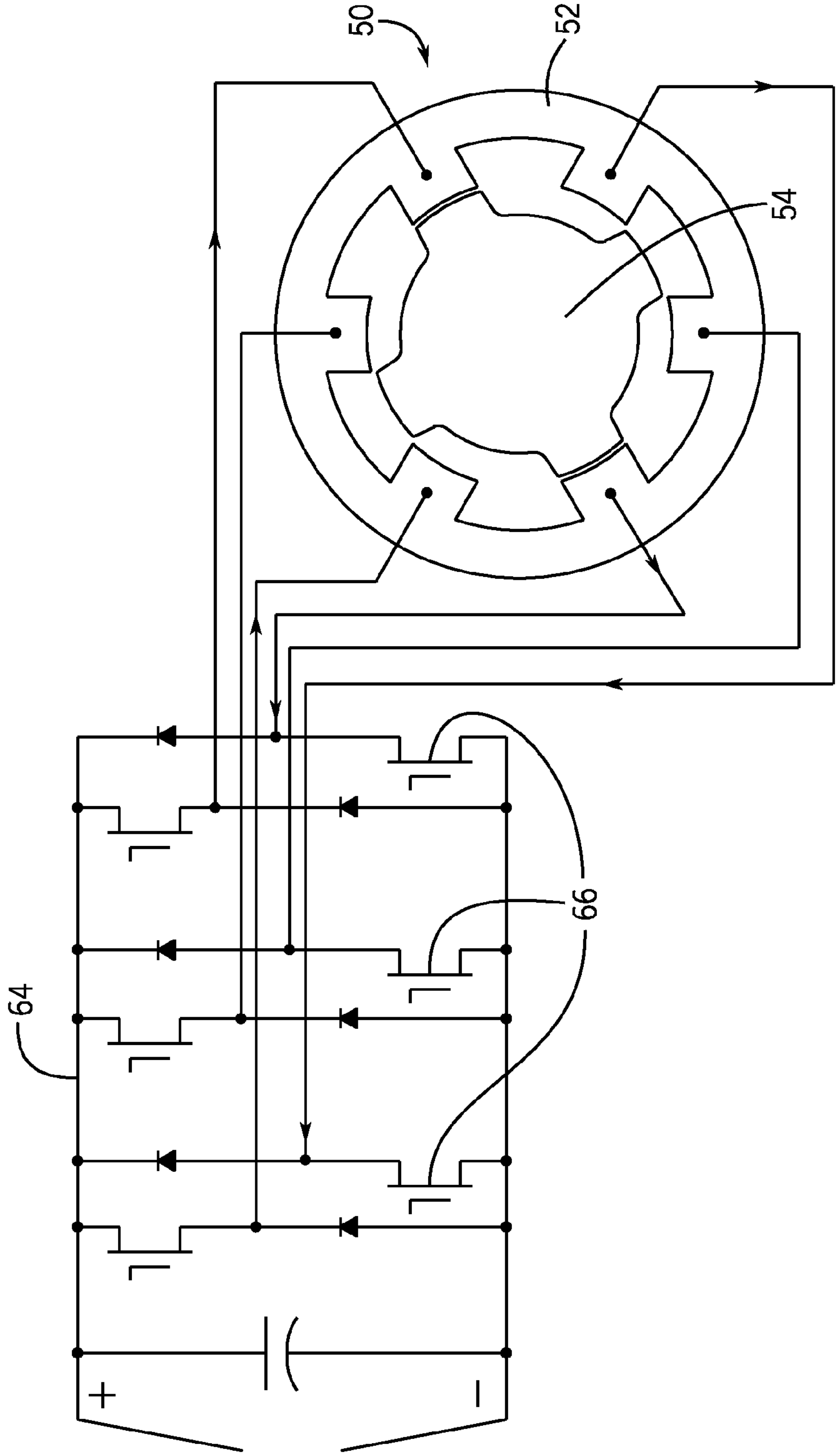
FIG. 6 is a diagram of a portion of starter machine control system according to some embodiments of the invention.

In some embodiments, the pole windings 58 disposed around the stator salient poles 56 can be coupled to the power source 14 via one or more inverters 64, as shown in FIGS. 5 and 6. For example, as shown in FIG. 5, in some embodiments, the switched reluctance solenoid assembly 50 can comprise two switched reluctance stator assemblies 52 and each of the stator assemblies 52 can be electrically coupled to a separate inverter 64. In other embodiments, the stator assemblies 52 can be electrically coupled to the same inverter 64. In some embodiments, the inverters 64 can be configured to operate as conventional inverters 64 (e.g., direct current flowing from the power source 14 can be converted to alternating current for use in the pole windings 58). Moreover, in some embodiments, one or both of the inverters 64 can comprise one or more solid-state switches 66 (e.g., a MOSFET) that can be in communication with the electronic control unit 16 (e.g., wired or wireless communication). As a result, when the electronic control unit 16 transmits instructions to energize the pole windings 58, direct current can begin passing through one and/or both of the inverters 64 and the pole windings 58 to move the rotor 54 and the pinion 32.

In some embodiments, the starter machine control system 10 can comprise a plurality of sensors 18 that can be in communication with the electronic control unit 16. For example, as shown in FIG. 5, in some embodiments, the control system 10 can comprise ring gear speed sensor 18*a*, a pinion speed sensor 18*b*, and pinion position sensor 18*c*. In some embodiments, the ring gear speed sensor 18*a* can be disposed substantially adjacent to the ring gear 36 so that the sensor 18*a* can assess a rotational velocity of the ring gear 36. Similarly, the pinion speed sensor 18*b* can be disposed substantially adjacent to the pinion 32 so that the sensor 18*b* can assess a rotation velocity of the pinion 32. Additionally, in some embodiments, the pinion position sensor 18*c* can be positioned so that it can assess movement of the pinion 32 (e.g., linear and/or axial movement) as the pinion 32 moves toward the ring gear 36 for engagement. In some embodiments, in addition to or in lieu of the previously mentioned sensors 18*a*-18*c*, the control system 10 can comprise other sensors 18 (e.g., temperature sensors). In some embodiments, the speed sensors 18*a*, 18*b* can be configured and arranged to assess position of the various elements of the system 10 (e.g., the pinion 32 and/or the ring gear 36). Moreover, as shown in FIG. 5, each of the sensors 18*a*-18*c* can be in communication (e.g., wired or wireless communication) with the electronic control unit 18. As a result, any data received by the sensors 18*a*-18*c* can be transmitted to the electronic control unit 16 for processing. Additionally, in some embodiments, the starter machine control system 10 can operate without any one or all of the sensors in an open-loop configuration.

In some embodiments, the electronic control unit 16 can regulate movement (e.g., linear and/or rotational movement) of the rotor 54 and the pinion 32 by regulating current flowing through one or both of the switched reluctance stator assemblies 52. For example, as previously mentioned, the switch reluctance solenoid assembly 50 can comprise two stator assemblies 52, an axially inner stator assembly 52*a* and an axially outer stator assembly 52*b*, as shown in FIGS. 5 and 7A-7C. Accordingly, in some embodiments, the electronic control unit 16 can vary current flowing through the inverters 64 and the pole windings 58 in one or both of the stator assemblies 52*a*, 52*b* to vary the magnitude of linear and/or rotational movements of the rotor 54. For example, in some embodiments, by dynamically changing current flowing to different stator salient poles 56 (e.g., circumferentially move around the stators 52), the magnetic flux can cause the rotor 54 to rotate.

Furthermore, in some embodiments, when the stator assembly 52 rotates the rotor 54, prior to ring gear 36 engagement, the only rotational load on the stator assembly 52 and rotor 52 is the overrunning torque of the clutch 30. As a result, the switched reluctance solenoid assembly 50 can be kept relatively small and generally reduce potential costs for power electronics. Additionally, by individually varying the magnitude of current flowing through the different stator assemblies 52*a*, 52*b*, the rotor 54 and pinion 32 can linearly move, as described in further detail below.

Figure 7A:
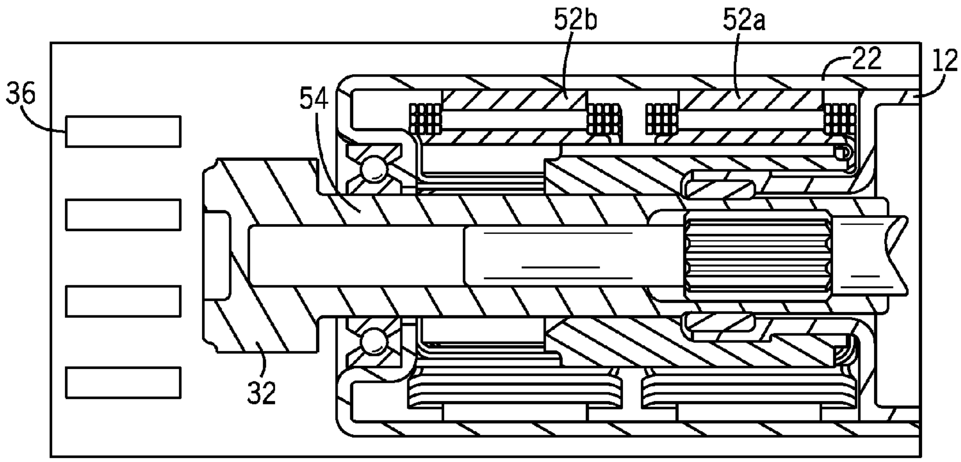
FIGS. 7A-7C are cross-sectional views of portions of a starter machine in different states of energization according to some embodiments of the invention.

For example, in some embodiments, different combinations of current flow through the stator assemblies 52*a*, 52*b* can lead to different linear positioning of the pinion 32 (i.e., pinion 32 and ring gear 36 engagement and disengagement). In some embodiments, by creating magnetic flux in one or both of the stator assemblies 52*a*, 52*b* by selectively passing current through dynamically switching stator salient poles 56, the rotor 54 and the pinion 32, can be moved in a generally linear direction. By way of example only, as shown in FIG. 7A, if the electronic control unit 16 directs current through the pole windings 58 surrounding the salient poles 56 of the axially inner stator assembly 52*a* (i.e., the right stator assembly in FIG. 7A), the magnetic flux associated with that stator assembly 52*a* can substantially attract and/or retain the rotor 54 (e.g., because of the composition of the rotor 54). As a result, in some embodiments, if the pinion 32 is already engaged with the ring gear 36, the pinion 32 can be substantially disengaged from the ring gear 36 during activation of only the axially inner stator assembly 52*a*. Further, in some embodiments, in order to keep the rotor 54 in a substantially axially inner position during non-operative periods, a permanent magnet (not shown) can be coupled to portions of the switched reluctance solenoid assembly 50 and/or the shaft 38 at a point substantially adjacent to the rotor 54. As a result, the permanent magnet can function to retain the rotor 54 and the pinion 32 during non-operative periods and the axially inner stator assembly 52*a* can remain substantially or completely de-energized (i.e., the axially inner stator assembly 52*a* need not be active to retain the rotor 54 and pinion 32 during non-operative periods).

Figure 7B:
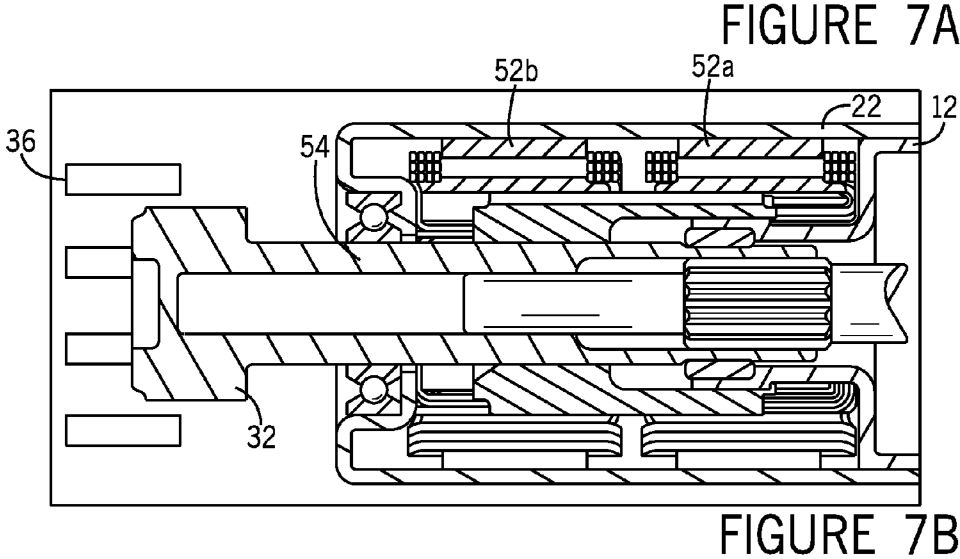
Figure 7C:
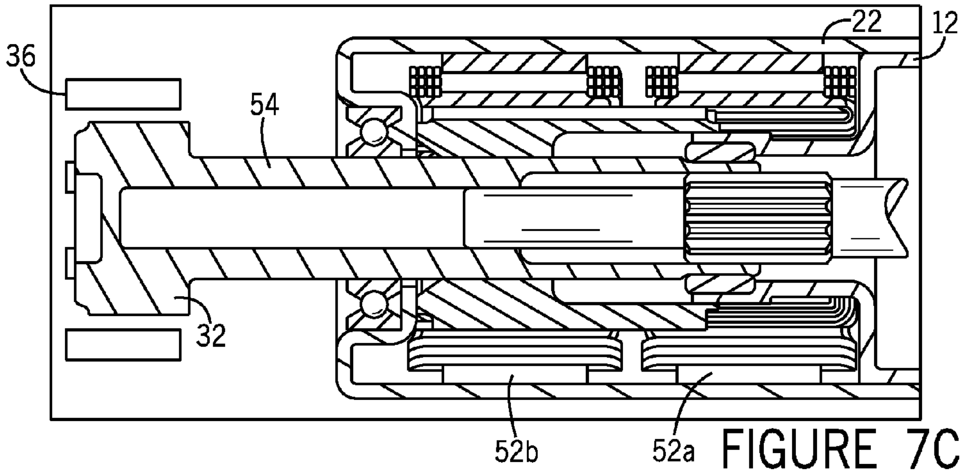

Further, in some embodiments, in response to signals from the electronic control unit 16, current can be directed only through the pole windings 58 surrounding at least a portion of the salient poles 56 of the axially outer stator assembly 52*b* (i.e., the left stator assembly in FIG. 7C). As a result, the magnetic flux associated with the axially outer stator assembly 52*b* can attract the rotor 54 and the pinion 32, which leads to these elements moving to an axially outer position. Accordingly, in some embodiments, by energizing the axially outer stator assembly 52*b*, the rotor 54 and pinion 32 can be moved axially outward so that the pinion 32 can engage the ring gear 36. After engaging the ring gear 36, the pinion 32 and the rotor 54 can receive torque from the motor 26 via the clutch 30 and/or gear train 24, which can lead to engine cranking. For example, in some embodiments, the motor 26 can be activated after engagement of the pinion 32 and the ring gear 36 to provide torque to the pinion 32 to crank the engine 20.

Moreover, in some embodiments, in response to signals from the electronic control unit 16, current can be directed through both of the switched reluctance stator assemblies 52*a*, 52*b*, as shown in FIG. 7B. Also, by using the electronic control unit 16 to direct current through both stator assemblies 52*a*, 52*b*, the current can be commuted substantially synchronously so that spatially equivalent salient poles 56 of the stator assemblies 52*a*, 52*b* can maintain substantially similar polarities at substantially the same time, which can lead to substantially similar magnetic flux distributions between the two stator assemblies 52*a*, 52*b*. As a result, in some embodiments, if the rotor 54 is rotating, when both stator assemblies 52*a*, 52*b* are energized, the rotor 54 can continue to rotate. In some embodiments, a substantially equal amount of current can pass through both stator assemblies 52*a*, 52*b* so that the magnetic flux of both stator assemblies 52*a*, 52*b* positions the rotor 54 at a generally axially central and/or medial position because the magnetic flux attracting the rotor 54 from both of the stator assemblies 52*a*, 52*b* is substantially or completely equal, as shown in FIG. 7B. Furthermore, in some embodiments, different amounts of current can be circulated through the different stator assemblies 52*a*, 52*b* to position the rotor 54 and pinion 32 at different locations along its axial path. For example, by passing more current through the axially outer stator assembly 52*b*, the rotor 54 and pinion 32 can be positioned at an axially outer position relative to when an equal amount or greater amount of current passes through the axially inner stator assembly 52*a* or vice versa. As a result, in some embodiments, the switched reluctance solenoid assembly 50 can provide at least both pinion 32-ring gear 36 engagement and disengagement functions using only magnetic flux to actuate the pinion 32 (e.g., the motor 26 can be substantially inactive during engagement and/or disengagement of the pinion 32 and a conventional solenoid assembly 28 is not necessary).

Accordingly, some embodiments of the invention can offer improvements over conventional solenoid assemblies 28. As previously mentioned, some conventional solenoid assemblies 28 can experience significant mechanical wear from repeated engagements and produce auditory disturbances during operations. In some embodiments, because magnetic flux is used to move the pinion 32 and rotor 54, rather than physical contact, the wear on the elements and auditory output can be at least partially reduced compared to some conventional systems. Moreover, some embodiments of the invention can offer reduced complexity relative to some conventional starters machines 12. For example, the starter machine 12 can operate without the need for some or all of the biasing members 42 because of the use of magnetic flux in engaging and disengaging the pinion 32 and the ring gear 36.

In addition to the conventional engine 20 starting episodes (i.e., a "cold start" starting episode and/or a "warm start" starting episode) previously mentioned, the starter machine control system 10 can be used in other starting episodes. In some embodiments, the control system 10 can be configured and arranged to enable a "stop-start" starting episode. For example, the control system 10 can start an engine 20 when the engine 20 has already been started (e.g., during a "cold start" starting episode) and the vehicle continues to be in an active state (e.g., operational), but the engine 20 is temporarily inactivated (e.g., the engine 20 has substantially or completely ceased moving).

Moreover, in some embodiments, in addition to, or in lieu of being configured and arranged to enable a stop-start starting episode, the control system 10 can be configured and arranged to enable a "change of mind stop-start" starting episode. The control system 10 can start an engine 20 when the engine 20 has already been started by a cold start starting episode and the vehicle continues to be in an active state and the engine 20 has been deactivated, but continues to move (i.e., the engine 20 is decelerating). For example, after the engine receives a deactivation signal, but before the engine 20 substantially or completely ceases moving (e.g., during coast-down or deceleration of the engine 20 and ring gear 36), the user can decide to reactivate the engine 20 so that the pinion 32 engages the ring gear 36 as the ring gear 36 is decelerating, but continues to move (e.g., rotate). After engaging the ring gear 36, the motor 26 can restart the engine 20 via the pinion 32 engaged with the ring gear 36. In some embodiments, the control system 10 can be configured for other starting episodes, such as a conventional "soft start" starting episodes (e.g., the motor 26 is at least partially activated during engagement of the pinion 32 and the ring gear 36).

The following discussion is intended as an illustrative example of some of the previously mentioned embodiments employed in a vehicle, such as an automobile, during a starting episode. However, as previously mentioned, the control system 10 can be employed in other structures for engine 20 starting.

As previously mentioned, in some embodiments, the control system 10 can be configured and arranged to start the engine 20 during a change of mind stop-start starting episode. For example, after a user cold starts the engine 20, the engine 20 can be deactivated upon receipt of a signal from the electronic control unit 16 (e.g., the vehicle is not moving and the engine 20 speed is at or below idle speed, the vehicle user instructs the engine 20 to inactivate by depressing a brake pedal for a certain duration, etc.), the engine 20 can be deactivated, but the vehicle can remain active (e.g., at least a portion of the vehicle systems can be operated by the power source 14 or in other manners). At some point after the engine 20 is deactivated, but before the engine 20 ceases moving, the vehicle user can choose to restart the engine 20 by signaling the electronic control unit 16 (e.g., via releasing the brake pedal, depressing the acceleration pedal, etc.). After receiving the signal, the electronic control unit 16 can use at least some portions of the starter machine control system 10 to restart the engine 20.

For example, in order to reduce the potential risk of damage to the pinion 32 and/or the ring gear 36, a speed of the pinion 32 can be substantially synchronized with a speed of the ring gear 36 (i.e., a speed of the engine 20) when the starter machine 12 attempts to restart the engine 20, which can be accomplished using some of the previously mentioned embodiments.

For example, in some embodiments, during the change of mind stop-start starting episode, the electronic control unit 16 can receive data from one or more of the sensors 18 to substantially or completely synchronize speeds of the pinion 32 and the ring gear 36. In some embodiments, the electronic control unit 16 can receive data from the ring gear speed sensor 18*a* that is reflective of the rotational velocity of the ring gear 36. The electronic control unit 16 can process the ring gear 36 velocity data and provide current to one or both of the stator assemblies 52*a*, 52*b* to begin movement of the rotor 54 and pinion 32. Moreover, the pinion speed sensor 18*b* can transmit the rotational velocity of the pinion 32 to the electronic control unit 16. As a result, in some embodiments, once the electronic control unit 16 determines that the relative rotational velocities of the pinion 32 and the ring gear 36 are substantially or completely synchronized, the electronic control unit 16 can reduce and/or eliminate current flowing through the pole windings 58 of the axially inner stator assembly 52*a* so that the rotor 54 and the pinion 32 move axially outward. According, the pinion 32 can engage the ring gear 36 when both elements are moving at substantially similar speeds. Moreover, once engaged, the motor 26 can be activated to transmit torque to the rotor 54 and pinion 32 to restart the engine 20. In some embodiments, after starting the engine 20, the current flowing through the axially outer stator assembly 52*b* can be reduced or eliminated and the current flowing through the axially inner stator assembly 52*a* can be increased so that the rotor 54 can move axially inward to disengage the pinion 32 and the ring gear 36.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A starter machine comprising:
- a housing;
- a motor being at least partially disposed within the housing, the motor being operatively coupled to a shaft; and
- a switched reluctance solenoid assembly being at least partially disposed within the housing, the switched reluctance solenoid assembly further comprising
  - at least two switched reluctance stator assemblies, and
  - a rotor being movably positioned within the switched reluctance stator assemblies, the rotor being operatively coupled to the shaft and a pinion.

2. The starter machine of claim 1 and further comprising a gear train being coupled to the shaft and the motor.

3. The starter machine of claim 2, wherein the gear train comprises a planetary gear assembly and a clutch.

4. The starter machine of claim 1, wherein the switched reluctance solenoid assembly is capable of being coupled to at least one inverter.

5. The starter machine of claim 1, wherein each of the switched reluctance stator assemblies are capable of being coupled to separate inverters.

6. The starter machine of claim 5, wherein the separate inverters are in communication with an electronic control unit.

7. The starter machine of claim 1, wherein the switched reluctance solenoid assembly is configured and arranged so that the rotor is capable of linear and rotational movement.

8. The starter machine of claim 1, wherein the switched reluctance stator assemblies each comprise a plurality of salient poles and a plurality of pole windings disposed around at least a portion of the plurality of salient poles.

9. The starter machine of claim 1, wherein the rotor comprises a plurality of salient poles.

10. The starter machine of claim 1, wherein the rotor comprises a plurality of splines and the shaft comprises another plurality of splines that are configured and arranged to engage the plurality of splines on the rotor.

11. A starter machine comprising:
- a housing;
- a motor being at least partially disposed within the housing, the motor being operatively coupled to a gear train comprising a planetary gear assembly and a clutch;
- a shaft being operatively coupled to the gear train; and
- a switched reluctance solenoid assembly being at least partially disposed within the housing, the switched reluctance solenoid assembly capable of being electrically coupled to at least two inverters that are in communication with an electronic control unit, the switched reluctance solenoid assembly further comprising at least two switched reluctance stator assemblies that each comprise a plurality of salient poles, and a rotor being operatively coupled to the shaft and comprising an integral pinion, the rotor being movably positioned within the switched reluctance stator assemblies, and wherein the rotor is capable of linear and rotational movement.

12. The starter machine of claim 11, wherein the electronic control unit is capable of being in communication with a plurality of sensors.

13. The starter machine of claim 12, wherein the plurality of sensors comprises at least one of a ring gear speed sensor, a pinion speed sensor, and pinion position sensor.

14. The starter machine of claim 11, wherein the switched reluctance solenoid assembly is configured and arranged to linearly move the rotor to engage the pinion with a ring gear of an engine.

15. The starter machine of claim 11, wherein the rotor comprises another plurality of salient poles.

16. The starter machine of claim 15, wherein the rotor comprises a lesser number of salient poles than do the switched reluctance stator assemblies.

17. The starter machine of claim 11, wherein each of the inverters comprises at least one solid-state switch that is in communication with the electronic control unit.

18. The starter machine of claim 11, wherein the switched reluctance stator assemblies each comprise pole windings that are capable of being electrically coupled to the at least two inverters.

19. A method of assembling a starting machine, the method comprising:

positioning a motor at least partially within a housing;

coupling the motor to a gear train comprising a planetary gear assembly and a clutch;

coupling a shaft to the gear train; and assembling a switched reluctance solenoid assembly by positioning at least two switched reluctance stator assemblies within the housing, the switched reluctance stator assemblies each comprising a plurality of salient poles and capable of being electrically coupled to at least two inverters that are in communication with an electronic control unit, operatively coupling a rotor to the shaft, the rotor comprising an integral pinion, and positioning the rotor with the switched reluctance stator assemblies so that the rotor is capable of linear and rotational movement.

20. The method of claim 19, wherein the switched reluctance solenoid assembly is configured and arranged to linearly move the rotor to engage the integral pinion with a ring gear of an engine.

* * * * *